United States Patent [19]

Leonard

[11] 4,340,124
[45] Jul. 20, 1982

[54] FOLDABLE MINICAR

[76] Inventor: Lloyd H. Leonard, 4414 Woodman Ave., Apt. 304, Sherman Oaks, Calif. 91413

[21] Appl. No.: 129,781

[22] Filed: Mar. 12, 1980

[51] Int. Cl.³ .......................................... B62D 39/00
[52] U.S. Cl. .................................. 180/208; 280/287; 296/27
[58] Field of Search ......................... 180/208, 311, 21; 280/639, 38, 641, 642, DIG. 5; 296/78.1, 27

[56] References Cited

U.S. PATENT DOCUMENTS

| D. 182,180 | 2/1958 | Grebow | 280/652 |
|---|---|---|---|
| 1,357,239 | 11/1920 | Krok | 296/78.1 |
| 2,670,216 | 2/1954 | Leonard | 280/645 |
| 2,771,089 | 11/1956 | Magida | 280/5.32 X |
| 3,004,619 | 10/1961 | Straussler | 180/208 |
| 3,289,780 | 12/1966 | Ferris | 280/202 |
| 3,329,228 | 7/1967 | Harris | 180/208 |
| 3,580,348 | 5/1971 | Di Blasi | 180/208 |
| 3,850,472 | 11/1974 | Greppi | 180/208 |
| 3,887,218 | 6/1975 | Di Blasi | 180/208 |
| 3,893,533 | 7/1975 | Tidwell | 180/21 |
| 4,089,542 | 5/1978 | Westerman | 280/639 |
| 4,151,939 | 5/1979 | Jorjorian | 280/289 A |

FOREIGN PATENT DOCUMENTS

| 1500026 | 9/1967 | France | 280/38 |
|---|---|---|---|
| 1513216 | 1/1968 | France | 280/639 |
| 2315425 | 1/1977 | France | 180/208 |

OTHER PUBLICATIONS

"Amigo" Brochure.
"Commuter" Brochure.
"E-Z-Go" Brochure.
"Tronicar" Brochure.
"Braune" Brochure.
"Tryke Sportster" Brochure.

Primary Examiner—Joseph F. Peters, Jr.
Assistant Examiner—M. J. Hill
Attorney, Agent, or Firm—Darle M. Short; Geoffrey R. Myers

[57] ABSTRACT

A minicar which can be folded into a smaller size, when not in use, is provided. The minicar is comprised of two main frames which are connected by a parallelogram linkage system. The minicar is unfolded and folded by swinging one of the frames in an arc with respect to the other frame. A separate linkage system is attached to the parallelogram linkage system to fold and unfold the rear wheels of the minicar. The rear wheels swing in an arc when the minicar is being folded or unfolded. The minicar has two stable states, the folded state and the unfolded state. In the unfolded state, one frame member is above and offset from the other frame member and the wheels are in the operating position. When the minicar is in the folded state, one frame is almost directly above the other frame and all the wheels are almost completely under the top frame. The minicar also comprises a foldable enclosure which folds into layers when the minicar is not being used.

16 Claims, 17 Drawing Figures

FOLDABLE MINICAR

This invention relates to land vehicles having a relatively small passenger and cargo capacity that are commonly operated at low speeds. More particularly, this invention relates to minicars (i.e., golf cart-like vehicles) used primarily in off-the-public highway driving such as at country clubs, resorts, retirement communities, etc.

Because of the gasoline shortage in this country, as well as for a matter of convenience, large developments such as retirement centers, resort areas, large camp grounds and small self-contained towns are using golf cart-like vehicles for the internal transportation of people and small cargoes. Also, since many resorts now offer transportation to and from the nearest airport to attract guests so that these guests will not have to rent cars upon their arrival, these resorts must furnish some type of transportation means for these guests since, after these guests reach the resort, they are dependent upon the resort for their transportation needs. For example, in a large resort area where the different recreational activities and other resort facilities are not within convenient walking distance, or, if the facilities are used by persons, such as the elderly, who, for health reasons, cannot walk any appreciable distance, golf cart-like vehicles can be used to transport these persons and their light cargoes between the facilities. In such a resort area, it may be desirable to have a fleet of these carts, because of the number of people needing such a cart simultaneously.

There are a number of minicars now on the market which can fulfill the need as expressed in the above paragraph. However, often an individual will be in a situation where it would be very convenient and highly desirable to have a minicar, but one is not furnished by the development at which he is temporarily, or permanently, residing.

For example, many retired persons who live in the northern part of the United States travel to and spend their winters in the southern half of the United States to avoid the harsh winters of the north. These persons usually either find a motel complex having a monthly or seasonal rental period or drive large mobile campers south and camp at campgrounds that offer similar rental agreements. Many of these motel complexes and campgrounds are like a small self-contained city with facilities for shopping, eating, etc., and with group tours arranged to leave from the development. Thus, once the guests are settled into one of these developments, the persons staying therein rarely have the need, or desire, to venture off the site in their own vehicles. However, because of the size of these motel complexes and campgrounds, one's campsite or room may be a mile or more away from the campground facilities. This distance makes it physically difficult for an elderly person to walk, especially if the person has to carry back to his or her camper or room any supplies. Driving to the facilities may be difficult also since it may involve unhooking the camper and then rehooking and rebalancing the camper after the errand is completed.

Unfortunately, most of these campgrounds do not have a fleet of minicars, or even one minicar for their campers to use, as the campground is trying to keep its operating costs as low as possible. It is in a context such as this that private individuals would find it economical and convenient to purchase a minicar for their private use.

Even if such an individual would buy a minicar from those now available on the market, the person would still have great difficulty in transporting the minicar along with the camper or the family car. Conventional golf carts and other similar vehicles of the two-passenger type generally weigh well in excess of 500 pounds. Thus, it would be impossible to lift such a vehicle to load the vehicle onto or into any vehicle. Therefore, the minicar would most likely have to be pulled directly behind the camper or family car, or placed on a specially built trailer and the trailer towed behind the family car or camper.

Moreover, the gasoline situation in the United States has reached crisis proportions. The United States is overly dependent on foreign oil and it is now a goal of this country to lessen this dependence on foreign oil. One means of lessening this dependence is by reducing the consumption of gasoline.

Furthermore, the price of gasoline has been rapidly escalating in the past decade and economists are predicting that the prices will continue to rise as the countries holding the major oil reserves are continually raising the price of crude oil. This continuing price increase is severely straining the budgets of many families.

It is thus desirable that cars be developed for use in this country which use a minimum amount of fuel, but which are still convenient and practical to use in most every day situations. For example, it would be desirable if a minicar, that would get very high gasoline mileage, could be developed for short intracity or intra-neighborhood trips during which the speed of the vehicle would always remain at a low speed. It would also be desirable that such a minicar be transportable within the family car so that the family car could be used to drive long distances at high speeds while the minicar could be used to drive short distances at a low speed.

It is apparent from the above that there exists a need in the art for a compact minicar which is capable of being folded into a shape such that it would take up a relatively small portion of the cargo area of a camper or pickup truck or could be placed in the back of a station wagon, or hatchback, or the trunks of some passenger cars. It is also apparent that there exists in the art a need for a minicar which can be used to handle everyday transportation needs that is convenient, practical, and economical to use. It is the purpose of this invention to fulfill these and other needs more apparent to persons skilled in the art once given the following disclosure:

Generally speaking this invention fulfills these needs by providing a foldable minicar comprising a first and a second frame, having a motor, steering means, braking means, accelerating means, front wheels, rear wheels, and a passenger seat attached to said frames, linkage connecting said first frame to said second frame, said linkage capable of moving said first frame with respect to said second frame to fold and unfold said minicar.

Because of the unique design of a minicar of this invention, this invention has the advantage of being the smallest acceptable size and the lightest practical weight for a vehicle of this type. These minimal size and weight capabilities enable the minicars of this invention to be employed in many situations where other minicars cannot be employed. A minicar could be built in accordance with this invention that could weigh less than 200 pounds. This is a weight that two or more men could easily lift and load into another vehicle if the weight is evenly distributed, as in this invention.

Another advantage of this invention is that it is possible to fold the minicars according to this invention into a shape that is convenient to load into a camper. A family travelling by camper is usually immobilized while the camper is connected to camper hook-ups. Such a family could overcome this immobilization by carrying a minicar according to this invention which could be used in such occasions.

Yet another advantage of this invention is that it provides an alternative to using larger vehicles which have a much lower gas mileage than the minicars of this invention in the many situations in which the minicars can be practically employed.

It is also an advantage of this invention that the minicars disclosed by this invention are convenient to use and highly maneuverable.

It is a further advantage of this invention that it can be employed for intracity or intra-neighborhood trips and reduce this country's gasoline consumption.

It is also an advantage of the minicars of this invention that they can be transported in the family car from the owners home to the innercity, whereupon the family car can then be parked and the minicars can be taken out of the family car, unfolded, and used for intracity driving.

Yet another advantage of this invention is that a foldable enclosure is provided to protect vehicle occupants from the sun and adverse weather.

This invention will now be described with respect to certain embodiments thereof as illustrated in the accompanying drawings wherein:

IN THE DRAWINGS

Figure 1:
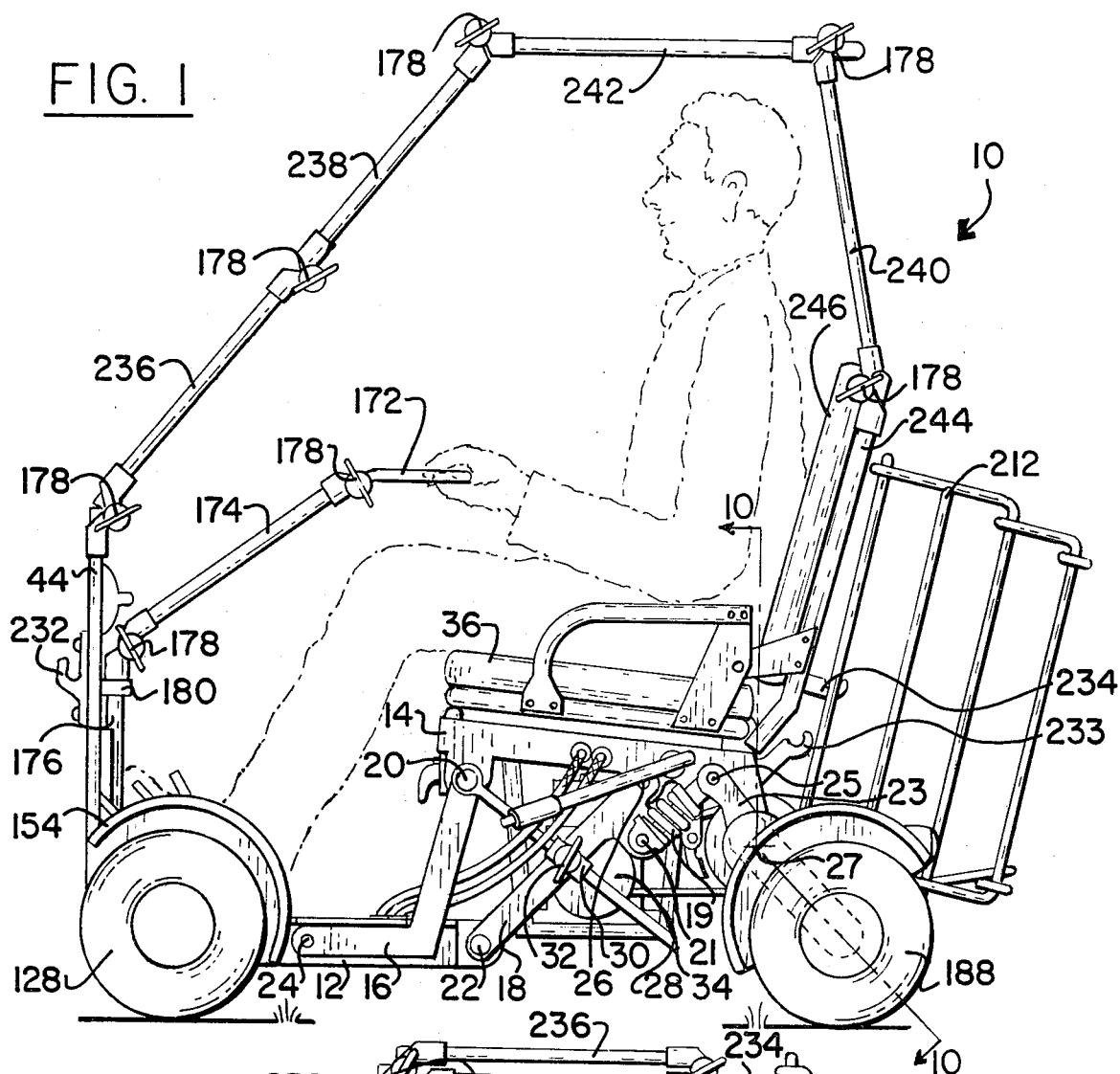
FIG. 1 is an elevational view illustrating one embodiment of this invention in the unfolded and operable state, and a person seated in the driving position.
Figure 2:
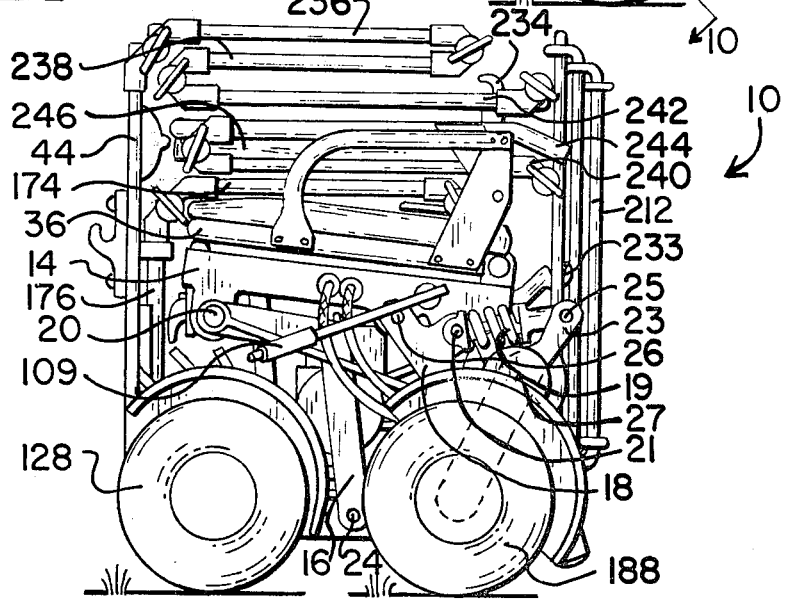
FIG. 2 is an elevational view of the embodiment of FIG. 1 in its folded state.
Figure 3:
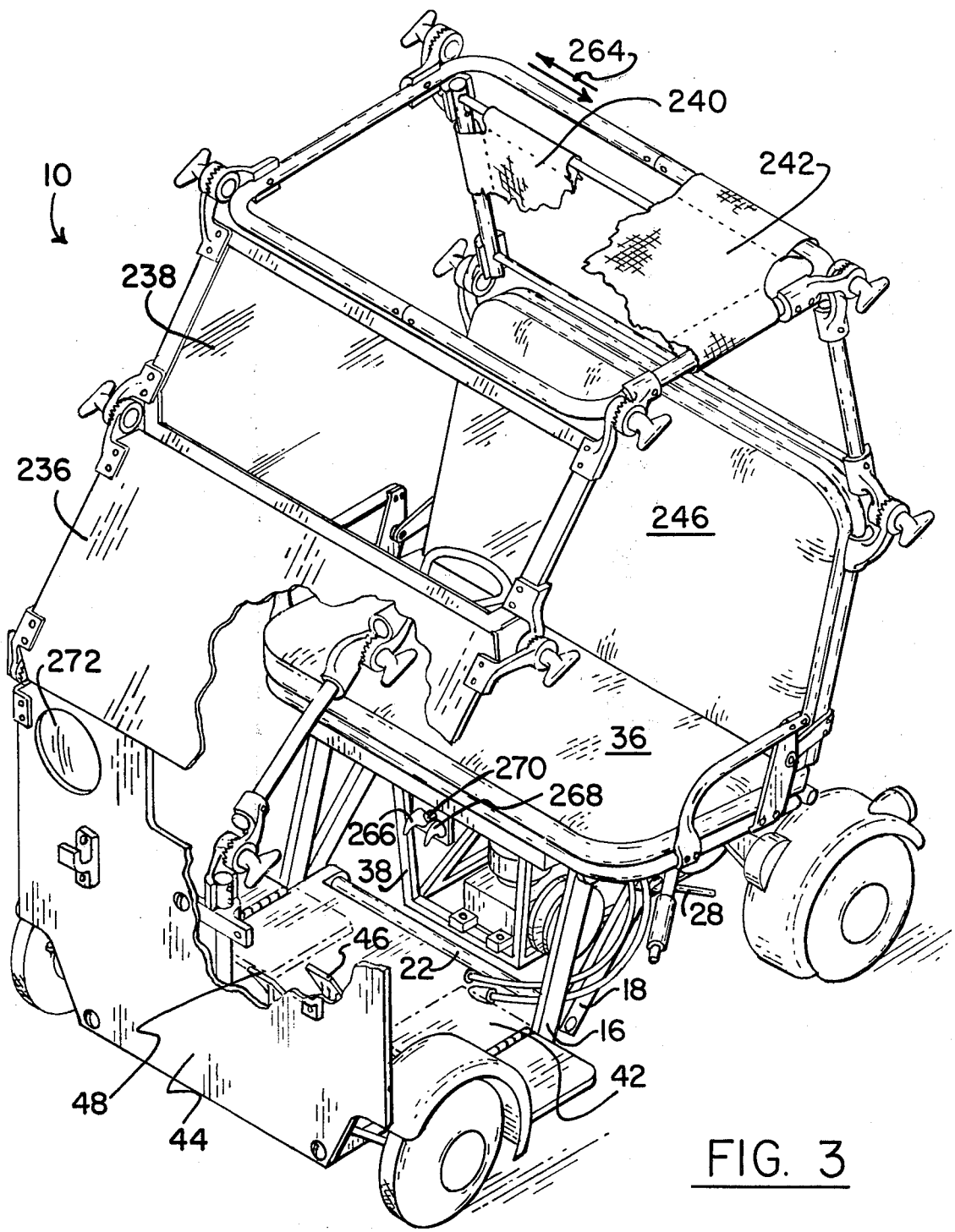
FIG. 3 is a perspective view of the embodiment of FIG. 1, partially sectionalized, in the unfolded and operable state.
Figure 7:
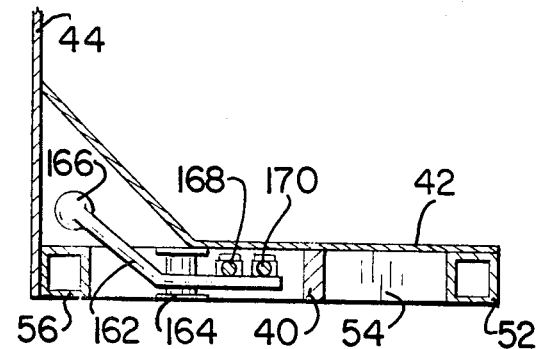
FIG. 7 is a side sectional view, along line 7—7 of FIG. 4, of part of the steering mechanism of this embodiment, with the wheel assembly not shown.
Figure 8:
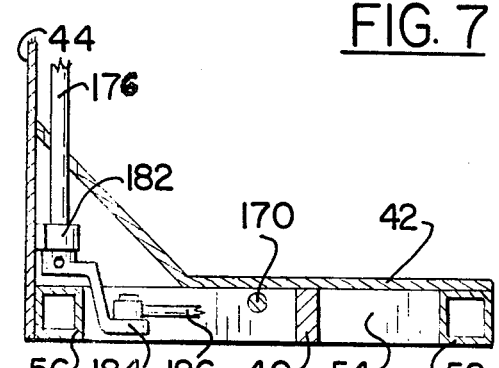
FIG. 8 is a side sectional view of this embodiment, along line 8—8 of FIG. 4, of a part of the steering mechanism, with the wheel assembly not shown.

Referring to the accompanying drawings, and in particular FIGS. 1, 2 and 3, minicar 10 has the basic elements that every motor vehicle must have, seat 36, gasoline motor 34 (located under seat 36), front wheels 128 and 130 and rear wheels 188 and 190, lower frame member 12 (to support a floorboard) and a steering mechanism. Minicar 10 is foldable because it is comprised of lower frame member 12 and upper frame member 14; upper frame member 14 being offset from lower frame member 12 and being connected thereto by a parallelogram linkage system. The parallelogram linkage system is comprised of forward links 16, rear links 18, forward pivoting crosstube 20, rear pivoting crosstube 22, and pivoting tubes 24 and 26.

One of forward links 16 and rear links 18 are located on each side of frame members 12 and 14 and each of said links are pivotally connected to said frame members. Forward links 16 are pivotally connected to upper frame member 14 by forward pivoting crosstube 20, which runs the entire width of minicar 10 and links the forward link 16 located on the driver's side of the car to the forward link 16 located on the passenger side. This ensures that each side of the minicar will move synchronously when minicar 10 is being folded and unfolded, thus enabling these actions to be performed with minimal difficulty.

Forward links 16 are in the shape of a dogleg as a safety measure so that one getting into or debarking from minicar 10 will be less likely to stumble over them than if forward links 16 were a straight member.

Rear links 18 are connected by a similar member, rear pivoting crosstube 22, which pivotally connects rear links 18 to lower frame member 12 and runs the entire width of minicar 10.

Forward links 16 are pivotally connected to lower frame member 12 by pivoting tubes 24 and rear links 18 are pivotally connected to upper frame members 14 by pivoting tubes 26. Pivoting tubes 24 and 26 are of a length sufficient to connect forward links 16 to lower frame member 12 and rear links 18 to upper frame 14, respectively, but they do not run the entire width of minicar 10.

An approximate parallelogram is formed by a line running from the centerline of pivoting tubes 24 to the centerline of rear pivoting crosstube 22, from this point to the centerline of pivoting tube 26, from this point to the centerline of forward pivoting crosstube 20, and from this point back to the beginning at the centerline of pivoting tube 24. This parallelogram continuously changes its shape as minicar 10 is folded and unfolded.

The linkage is designed such that a parallelogram defined by a plane running between the centerlines of forward pivoting crosstube 20 and pivoting tubes 24 and terminating at the outer ends thereof will move in synchronization with a parallelogram defined by a plane running between the centerline of rear pivoting crosstubes 22 and pivoting tubes 26 and terminating at the outer ends thereof, as the car is folded or unfolded.

As a further safety measure, the linkage further comprises retention struts 28 located on each side of minicar 10. One end of retention struts 28 is pivotally connected to forward pivoting crosstube 20. Retention struts 28 are received by sleeve members 30, which are rotatably attached to rear links 18, and are capable of locking retention strut 28 in place. Sleeve members 30 offer no resistance to the swinging of the linkage if they are not tightened; however, if sleeve members 30 are tightened by hand clamp 32, then retention strut 28 is locked in place. Retention strut 28 is designed to be locked in place when minicar 10 is being operated, and, when it is in the folded state, to prevent unintentional folding or unfolding of minicar 10. For example, if minicar 10 was being driven over a bumpy road, and, if retention struts 28 were unlocked, and the force of the front tires hitting the bumps may be a sufficient force to cause minicar 10 to change from the folded state to the unfolded state. This, of course, must be prevented, even though the chances of it occurring are very small, and, thus, the reasoning for employing retention struts 28 and sleeve members 30. An even stronger lock can be provided if retention struts 28 have notches therein to engage hand clamps 32 to ensure a positive locking action.

Rear links 18 have pivotally connected thereto, by pivot tubes 21, one end of spring links 19. The other end of spring links 19 is pivotally attached to one end of trailing links 23 by pivot tubes 25. Rear wheels 188 and 190 are rotatably attached to the other end of trailing links 23. Trailing links 23 are pivotally attached to upper frame member 14, the pivot point represented by the X numbered 27 on FIGS. 1 and 2. Thus, as rear links 18 are rotated back to fold minicar 10, spring links 19 are pushed to the position shown in FIG. 2. This in turn causes trailing links 23 to rotate around pivot point 27, pulling rear wheels 188 and 190 in an arc forward.

Figure 11:
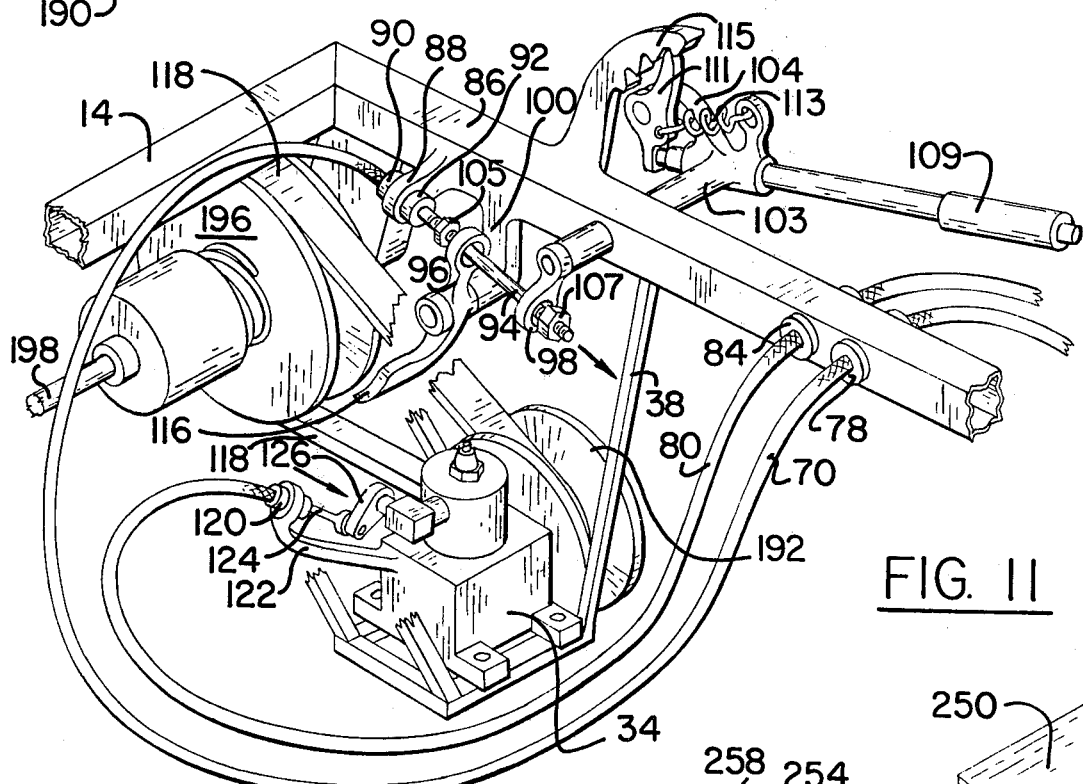
FIG. 11 is a perspective view of the brakes, the hand brake linkage, the accelerator linkage, and the engine power train of the embodiment of this invention illustrated in FIG. 10.

Minicar 10 is powered by gasoline motor 34, located under passenger seat 36. Gasoline motor 34 is supported by motor support 38 which hangs down from, and is connected to, upper frame member 14, as shown in FIGS. 1 and 11.

Lower frame member 12 is a unitary molded piece forming a rectangle having the sides 50, 52, 54, and 56 and having cross support 40 running the length thereof. Floor board 42 is attached to the top of and supported by lower frame member 12. Bulkhead 44 is attached to the front of lower frame member 12 and floor board 42. Floor 42 is slanted upward at the front part in order to provide bracing for bulkhead 44.

Figure 9:
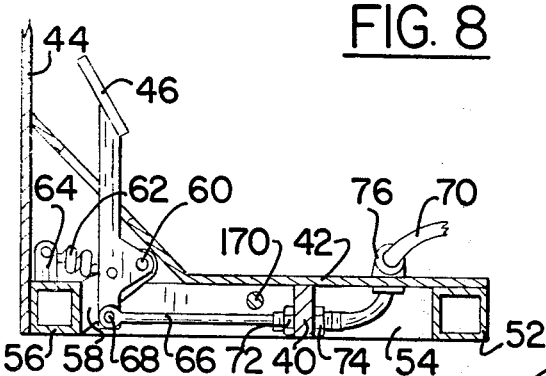
FIG. 9 is a side sectional view, taken substantially along line 9—9 of FIG. 4, illustrating a typical pedal assembly which can be employed in this invention.

Minicar 10 has two operating pedals, a brake pedal 46 and an accelerator pedal 48. The pedals are both fastened in place in the same manner, as illustrated in FIG. 9 which illustrates, in particular, the brake pedal assembly. Thus, even though only the brake pedal assembly will be described in detail, it should be noted that the accelerator pedal assembly is comprised of the same elements attached in the same manner, except as later noted.

Brake pedal 46 is pivotally connected by pivot tube 60 to boss 58, which, in turn, is rigidly connected to side 56 of lower frame member 12. Brake pedal 46 thus pivots around pivot tube 60 as pressure is put on the top of brake pedal 46. Spring 62, which has one end attached to brake pedal 46 and the other end attached to lug 64, resists this pressure, and forces brake pedal 46 back into the equilibrium position once the pressure is released from the pedal. Push/pull rod 66 is pivotally connected by pivot tube 68 to the end of brake pedal 46 opposite the end where the foot pressure is applied. Thus, as foot pressure is applied to the top of brake pedal 46, brake pedal 46 rotates around pivot tube 60, putting spring 62 in tension and pushing push/pull rod 66 towards the rear of minicar 10.

Push/pull rod 66 is supported at its other end by cross support 40 wherein push/pull rod 66 connects to brake push/pull cable 70. The connection of push/pull rod 66 and brake push/pull cable 70 is secured to cross support 40 by nuts 72 and 74. Brake push/pull cable 70 then passes through grommet 76, which is embedded in floor board 42 to protect push/pull cable 70 from getting damaged at that point. From grommet 76, brake push/pull cable 70 next passes through grommet 78 which is embedded inside post 86 of upper frame member 14.

The brake and accelerator assemblies have been comprised of the same structure and elements functioning in the same manner, up to this point. Thus, accelerator push/pull cable 80 passes through grommets 82 and 84, embedded within floor board 42 and side post 86, respectively. However, from this point on, the assemblies differ and each will now be described separately, beginning with the brake assembly.

After passing through grommet 78, brake push/pull cable 70 swings around gasoline motor 34 and is attached to bracket 88, which is fixably attached to side post 86, by engaging washers 90 and 92. At this point of attachment, brake push/pull cable 70 is connected to brake actuating rod 94.

Brake actuating rod 94 is the mechanism which moves to actually activate brake shoe 116 of the minicar. From its connection with brake push/pull cable 70, brake actuating rod 94 extends forward, passing through brake lever 96 and actuating lever 98. Brake lever 96 is pivotally connected to bracket 100 which extends downward from, and is fixably attached to, side post 86. Actuating lever 98 is attached to one end of brake member 103, which in turn, passes through side post 86. Located on brake actuating rod 94 are adjustment bolts 105 and 107 which can be adjusted laterally along actuating rod 94 to regulate the "slack" in the brakes.

The foot brake assembly operates as follows. When the driver depresses brake pedal 46, the motion is transmitted through the push/pull system to brake actuating rod 94. Brake actuating rod 94 is extended forward by the push/pull system such that adjustment bolt 105 engages brake lever 96 and rotates brake lever 96 around bracket 100 until brake shoe 116 engages V-belt sheave 118, braking minicar 10.

In the alternative, the hand brake can be used instead of the foot brake to brake the vehicle; or the hand brake can be used as a parking brake. Hand brake lever 109 is connected to the opposite end of brake member 103, from actuating lever 98, outside of upper frame member 14. The end of hand brake lever 109 opposite the end accessible to the driver engages pawl 111. Pawl 111 is spring-loaded, spring 113 running between pawl 111 and brake member 103. Pawl 111 is also rotatably connected to arm 104 of brake member 103 and engages extending teeth 115 which are attached to side post 86.

The hand brake system operates as follows. Hand brake lever 109 is rotated in an arc around the centerline of brake member 103. This movement in turn swings actuating lever 98 in an arc around the centerline of brake member 103, in the same direction that hand brake lever 109 is being rotated. Actuating lever 98 engages adjustment nut 107 and pulls brake actuating rod 94 forward. As brake actuating rod 94 is pulled forward, adjustment nut 105 engages brake lever 96 and rotates the same such that brake shoe 116 engages V-belt sheave 118. To disengage the hand brake, pawl 118 is released by pushing hand brake button 111.

Turning now to the accelerator assembly, accelerator push/pull cable 80, after passing through grommet 84, swings around gasoline motor 34 to cable-rod connector 120 which is supported by bracket 122. Bracket 122 is attached to the housing of gasoline motor 34. Cable-rod connector 120 connects accelerator push/pull cable 80 with accelerator actuating rod 124. When accelerator pedal 48 is depressed, this force is transmitted through the accelerator push/pull system to accelerator actuating rod 124. Accelerator actuating rod 124 is pushed forward, which rotates throttle lever 126, causing gasoline motor 34 to increase its speed.

Figure 6:
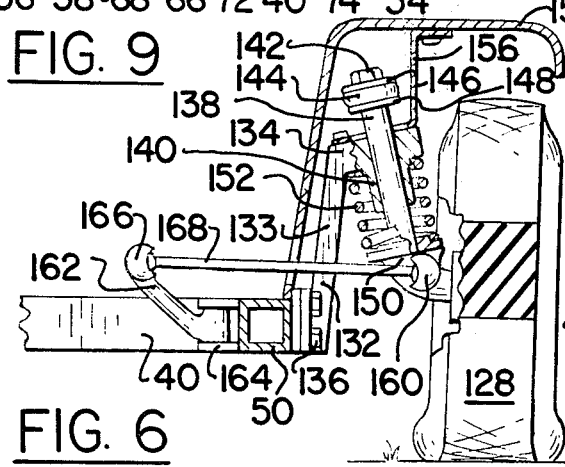
FIG. 6 is a front sectional view, taken substantially along line 6—6 of FIG. 4, of the suspension system of the embodiment of this invention illustrated in FIG. 4.
Figure 5:
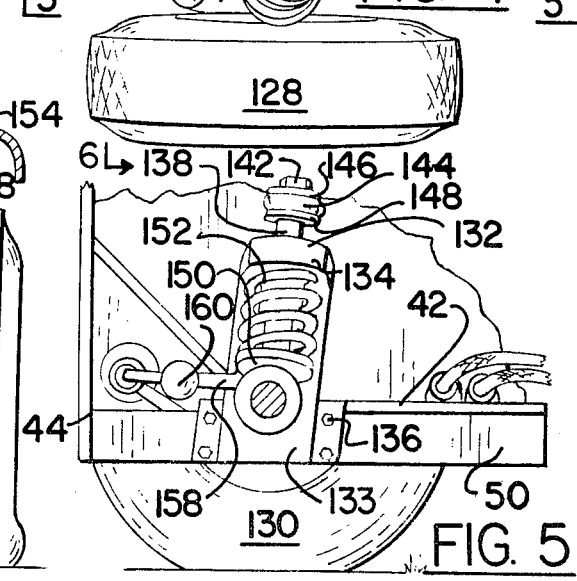
FIG. 5 is a side sectional view along line 5—5 of FIG. 4, of the suspension system elements of the embodiment illustrated in FIG. 4.

The suspension and steering assemblies for minicar 10 can best be seen in FIGS. 4-8. Front wheels 128 and 130 are suspended from lower frame member 12 as follows. Brackets 132 are attached to lower frame member 12 by bolt assemblies 136. Brackets 132 have one flange extending upward, flange 133, and another flange, flange 134, extending outward, at the top of flange 133 as shown in FIG. 6. Flanges 134 have as an element thereof bosses 140 having holes therethrough to receive kingpins 138. Kingpins 138 in this embodiment are one-piece kingpin and axle members, conventional in the automotive industry. Kingpins 138 are sloped both outward and towards the rear with respect to minicar 10 to provide both steering control and spring suspension.

At the top ends of kingpins 138 are located elastomers 144 which are fastened to kingpins 138 by bolts 142 and restraining washers 146 and 148. The bottom ends of kingpins 138 are received in thrust bearings 150. Suspension springs 152 encompass the middle section of kingpins 138 and are in compression between flanges 134 and thrust bearings 150. Further support and stability for the wheel assembly is achieved by having front fenders 154 attach to sides 50 and 54 and by having brackets 156 attached to front fenders 154 and brackets 132.

The suspension system operates as follows. As minicar 10 is driven, front wheels 128 and 130 will, of course, encounter many bumps and obstacles. The wheels will react to these obstructions by moving vertically with respect to lower frame member 12. If front wheel 128 hits a bump, kingpin 138 is driven up inside of boss 140. This movement is resisted by suspension spring 152 which also reacts when the bump is passed over to drive front wheel 128 back to equilibrium. If front wheel 128 encounters and enters a hole, kingpin 138 moves vertically downward with respect to boss 140. The maximum movement downward permitted is limited by elastomer 144 and restraining washer 148, which will engage bracket 132 if kingpin 138 moves too great a distance downward with respect to flange 134. Elastomers 144 are made out of a resilient material so that they can also absorb some shock.

The elastomers can be replaced by one or more mechanical springs such as "Belleville" springs if desired and the suspension system will still properly operate.

The steering mechanism on minicar 10 is constructed as follows. Steering arms 158 extend outwardly from kingpins 138 towards the front of minicar 10. On the end of steering arms 158 opposite kingpins 138 are steering arm sockets 160.

Bell cranks 162 are dog-legged and are pivotally attached to sides 50 and 54 by brackets 164 at the junction of the dog legs. Bell crank sockets 166 are located on the end of bell cranks 162 which extends towards the front of minicar 10. Links 168, having a ball at each end to interface bell crank sockets 166 and steering arm sockets 160, connect steering arms 158 with bell cranks 162, so that bell cranks 162 and steering arms 158 move synchronously. Cross link 170 connects the ends of bell cranks 162 opposite bell crank sockets 166 together so that front wheels 128 and 130 are synchronously positioned and maneuvered.

The steering system extending above floor board 42 is comprised of steering handle 172, tiller arm 174, tiller shaft 176 and two hand clamps 178, as shown in FIGS. 1 and 3. Steering handle 172 is adjustably attached to tiller arm 174 which, in turn, is adjustably attached to tiller shaft 176. The steering mechanism can be adjusted to any position by varying the positions of hand clamps 178 which are located between tiller arm 174 and tiller shaft 176 and between tiller shaft 176 and steering handle 172. Hand clamps 178 will be later described in more detail. Tiller shaft 176 is attached to bulkhead 44 by pillow blocks 180 and 182.

Below floor board 42, steering lever 184 is attached to tiller shaft 176 immediately below pillow block 182. Tie rod 186 connects steering lever 184 to one of bell cranks 162, attaching to the bell crank 162 at a point between the junction of the dog legs and the point where cross links 170 attaches to the bell crank 162.

Thus, as one driving minicar 10 pushes steering handle 172 in a direction, tiller shaft 176 will rotate in the same direction. This, in turn, will rotate steering lever 184 in a circular path around the centerline of tiller shaft 176. The rotation of steering lever 184 will move tie rod 186 such that it will either push or pull on bell cranks 162, causing bell cranks 162 to rotate around brackets 164. When bell cranks 162 so rotate, bell crank sockets 166 also rotate, rotating front wheels 128 and 130 around the center axis of kingpins 138.

Figure 4:
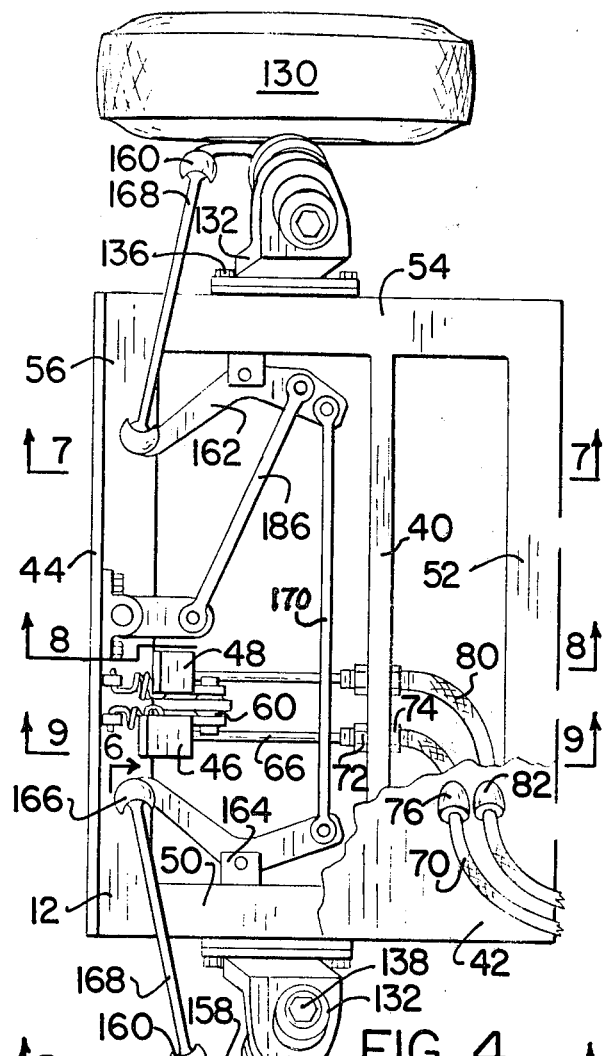
FIG. 4 is a plan view, partially sectionalized, of the front portion of one embodiment of this invention, illustrating the foot brake linkage, the steering linkage, and the accelerator control linkage.

The steering geometry illustrated in FIG. 4 provides for a very efficient steering operation. As minicar 10 turns a corner, the inside wheel of minicar 10 will be on a more sharply curved path than the outer wheel during the turn. This prevents scruffing and side slippage of tires during a sharp turn.

Figure 10:
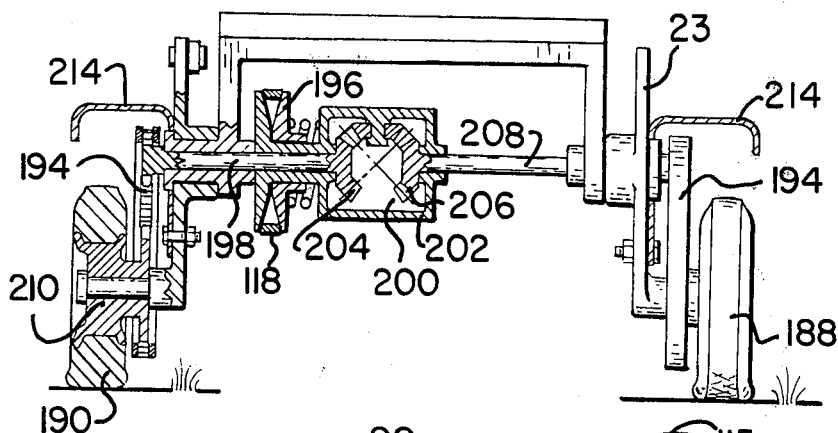
FIG. 10 is a partially sectionalized view along, in part, line 10—10 of FIG. 1, showing details of one embodiment of the power drive train and the real wheels of this invention.

The power train of minicar 10 between gasoline motor 34 and rear wheels 188 and 190 is as shown in FIGS. 10 and 11. The power train comprises, in part, a torque converter. The torque converter illustrated in the figures consists of variable ratio pulley 192 attached to the extended drive shaft and to variable ratio V-Belt pulley 196 located on drive shaft 198. V-belt 118 connects the two pulleys 192 and 196. There are many other conventional torque converters which could be employed with this invention, either of the speed sensitive or torque sensitive type that shift the sleaves and the V-belt automatically to satisfy the driving conditions.

As shown in FIG. 10, differential 200 is provided in the power train to assure equal distribution of driving torque to rear wheels 188 and 190. In one embodiment of this invention, differential 200 is comprised of differential outer housing 202 and bevel gears 204 and 206. Bevel gears 204 and 206 are located on one end of drive shafts 198 and 208, respectively. The torque applied to drive shafts 198 and 208 is transmitted to rear wheels 188 and 190 by typical chain drive trains 194 which rotate wheel rims 210.

Rear wheel fenders 214 protect the occupant and the mechanical parts of minicar 10 from mud and water splashes from rear wheels 188 and 190.

Figure 12:
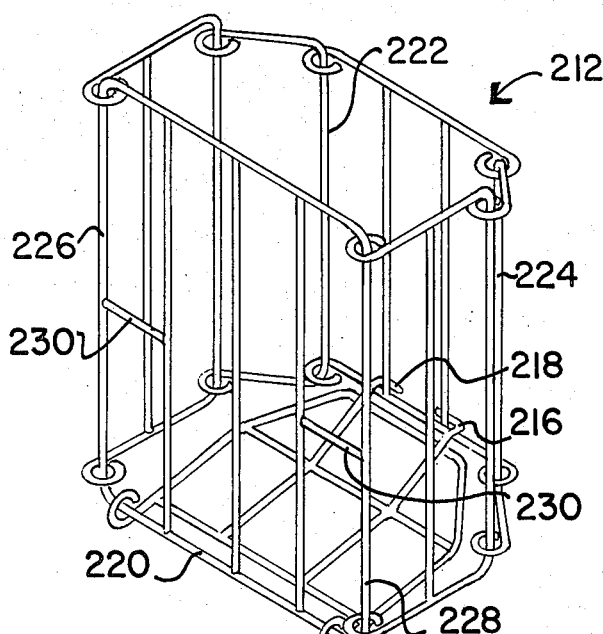
FIG. 12 is a perspective view of one embodiment of a foldable rack which can be attached to the back of a minicar built according to this invention, the rack being in the unfolded and usable state.
Figure 13:
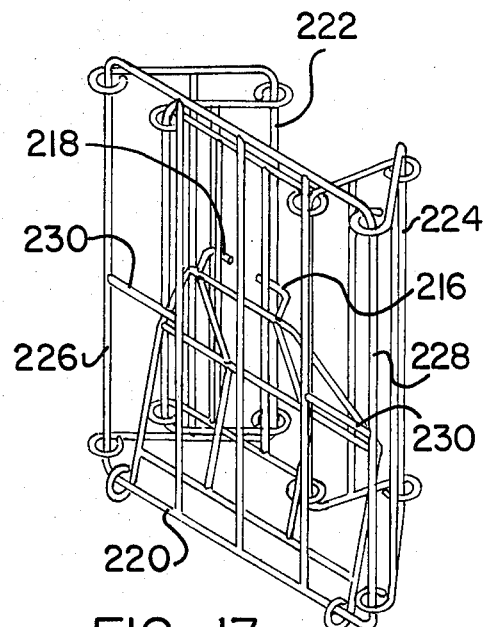
FIG. 13 is a perspective view of the rack embodiment illustrated in FIG. 12, in a partially folded up condition.

FIGS. 12 and 13 illustrates an embodiment of collapsible carrying container 212 which can be attached to the front or back of minicar 10. FIG. 12 shows carrying container 212 in the unfolded state while FIG. 13 shows carrying container 212 in the partially folded state. Carry container 212 is foldable because many of the junctions of the rods are comprised of ends of rods curled around other rods. These junctions make simple and effective folding hinges.

Two of the rods making up the bottom of carrying container 212 are bent towards each other, on their ends, around two back rods, to form catches 216 and 218. In this design, when the bottom of the container is rotated around bottom front rod 220, catches 216 and 218 pull the back of carrying container 212 towards the front until carrying container 212 is in the position shown in FIG. 13. To complete the folding of carrying container 212, force can be exerted at back edges 222 and 224, swinging these edges forward around front rods 226 and 228.

Carrying container 212 can be attached to either the front or the back of minicar 10 by placing the container such that cross rods 230 are received in front hooks 232 or back hooks 234. When minicar 10 is in the folded state, folded carrying container 212 can be attached to hooks 233 as shown in FIG. 2 for storing or transporting.

Minicar 10 can be partially enclosed to protect occupants from adverse weather or to shade the occupants from the sun, as illustrated in FIGS. 1–3. Attached to the top of bulkhead 44 by hand clamps 178 is front panel 236. Attached to the top of front panel 236, also by hand clamps 178, is windshield panel 238. Back panel 240 is attached, by hand clamps 178, to and extends upward from, the top of seat support panel 244. Roof panel 242 extends between windshield panel 238 and back panel 240 and is connected to the top of each by hand clamps 178.

Figure 16A:
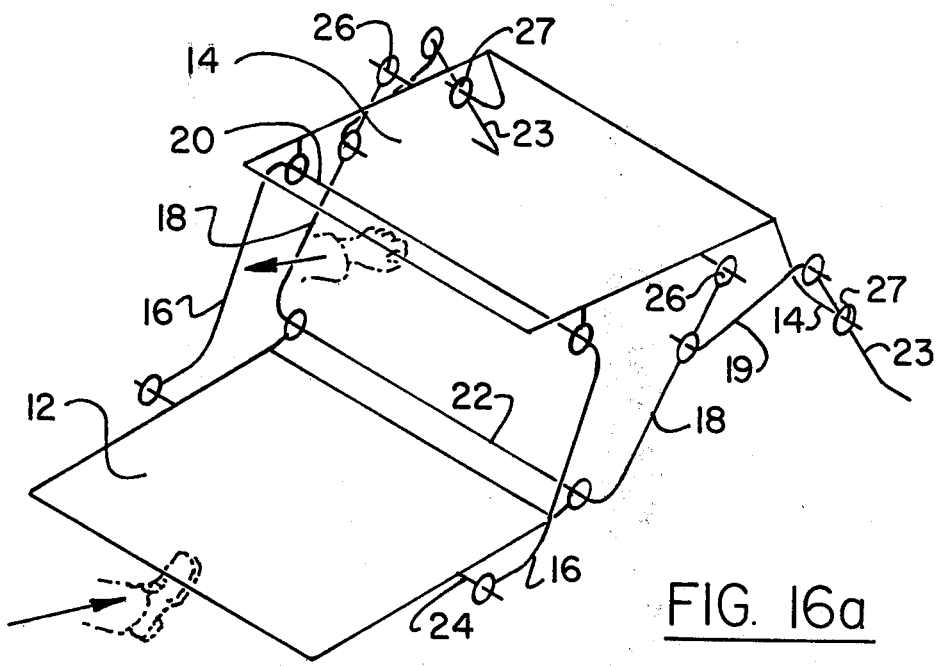
FIG. 16a is a schematic line drawing illustrating the basic structural parts and linkages of the folding elements of this invention in the unfolded state, the hand and foot illustrating one location and the direction of forces an individual could employ to fold up the minicar.
Figure 16B:
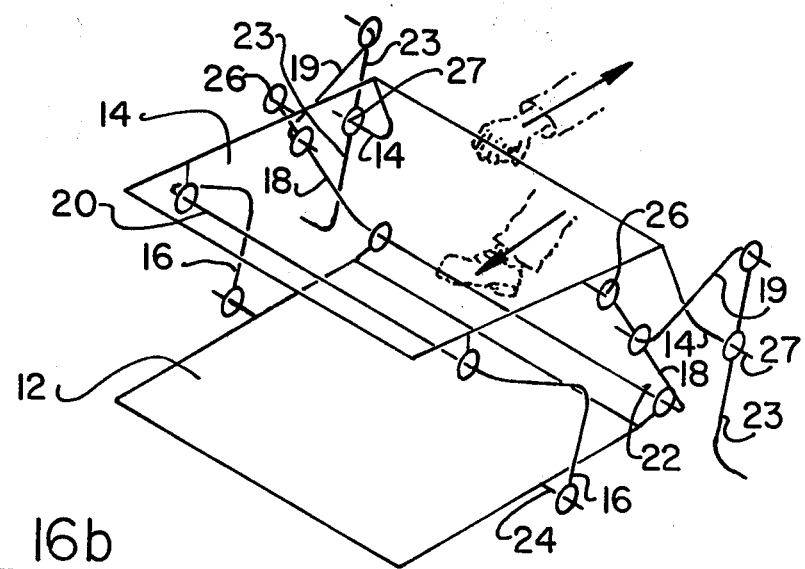
FIG. 16b is a schematic line diagram, as in FIG. 16a, showing the folding elements in the folded state, the hand and foot demonstrating one location and the direction of forces an individual could employ to unfold the minicar.

From the erected position, the folding of the enclosure elements proceeds as follows. First, the hand clamps 178 between roof panel 242 and back panel 240 must be completely disengaged so that roof panel 242 and back panel 240 are free to move independently with respect to each other. Then a sideways force is applied on back panel 240 while exerting a force in the opposite direction on roof panel 242. Arrows 264 on FIG. 3 represent these two forces. Next, the hand clamps 178 between seat support panel 244 and back panel 240 are loosened so that back panel 240 can be swung forward around the loosened hand clamps until it interfaces the back seat cushion 246. Then, hand clamps 178 between roof panel 242 and windshield 238 are loosened and roof panel 242 swung upwards and forward around the just loosened hand clamps until it rests on windshield 238. Next, the hand clamps 178 between front panel 236 and windshield panel 238 must be loosened so that windshield panel 238 and roof panel 242 can downwardly swing about this hand clamp. Then, minicar 10 can be folded as shown in FIGS. 16a and 16b and as will be described later.

Before proceeding to further fold the enclosure panels of minicar 10, the steering control elements must be either moved or removed. The steering control elements can be moved by loosening the hand clamp 178 located between tiller shaft 176 and tiller arm 174 and the hand clamp 178 between tiller arm 174 and steering handle 172. After these hand clamps are loosened, tiller arm 174 and steering handle 172 can be laid on seat 36, out of the way of the elements of the enclosure.

Figure 15:
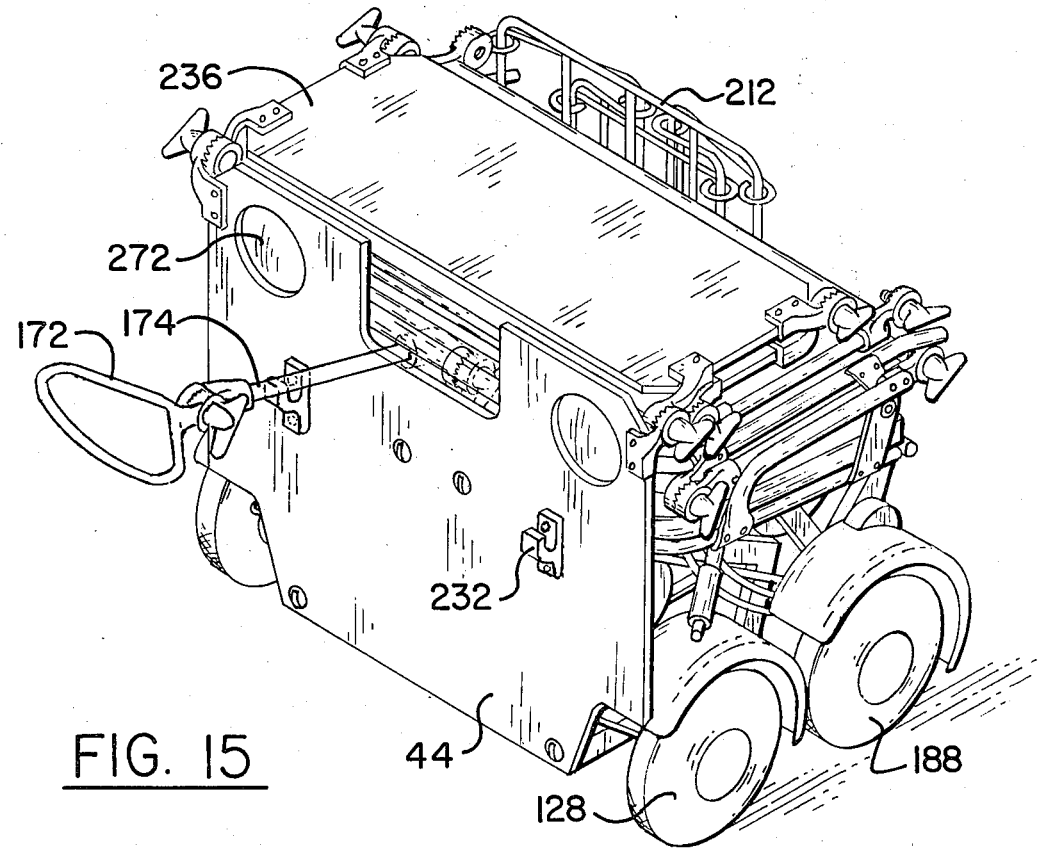
FIG. 15 is a perspective view of one embodiment of this invention in the folded state.

In the alternative, the hand clamp 178 between tiller shaft 176 and tiller arm 174 can be completely disengaged and reattached extending forward out of bulkhead 44 as shown in FIG. 15. If this alternative is used, steering handle 172 can be employed to steer minicar 10 when minicar 10 is in the folded (or unfolded) state.

Seat back cushion 246, seat support panel 244, and back panel 240 can then be folded down on top of tiller arm 174 and steering handle 172. Lastly, the hand clamp 178 between bulkhead 44 and front panel 236 is loosened such that roof panel 242, windshield panel 238, and front panel 236 swing on top of seat support panel 244.

Figure 14:
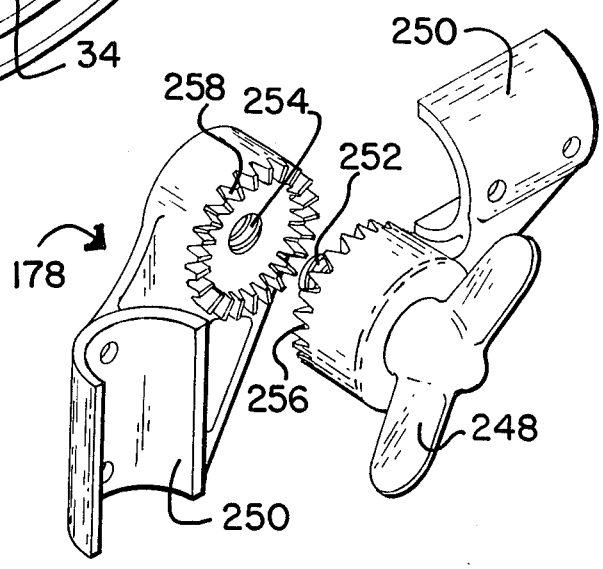
FIG. 14 is a perspective exploded view of a typical hand clamp which can be employed in various locations throughout the minicar of this invention.

A typical hand clamp which can be employed at the various joints of the enclosure elements, the steering controls, and sleeve 30, is illustrated in FIG. 14. FIG. 14 illustrates the hand clamp in the disengaged position. The panels or rods of the elements to be attached are fastened to brackets 250 which can be designed to receive either rectangular or round objects.

Threaded portion 252 is then placed in threaded receiving means 254 and wing nut 248 tightened. If the wing bolt is tightened such that serrated teeth 256 and 258 engage each other, then the elements attached to brackets 250 are stationary with respect to each other. Then, if it is desired that the relative position of the attached elements be changed, wing nut 248 can be loosened such that teeth 256 and 258 are disengaged, while threaded portion 252 remains engaged with receiving means 254. The elements can then be rotated with respect to one another and wing nut 248 retightened when the elements reach their desired relative positions.

The basic folding linkage is illustrated by the line drawings of FIGS. 16a and 16b. In these Figures, the hands and feet illustrated demonstrate locations where force can be applied to fold and unfold the minicar 10. FIG. 16a represents the linkage system of minicar 10 in the unfolded state and FIG. 16b represents the linkage system of minicar 10 in the folded state.

Minicar 10 can be folded by grabbing onto the front of upper frame member 14 and pulling it forward while bracing one's foot against the front of lower frame member 12. Minicar 10 can be unfolded by grabbing the back of upper frame member 14 and pulling it backward while bracing one's feet against the back of lower frame member 12.

As minicar 10 is being folded, lower frame member 12, front links 16, and rear links 18 swing in an arc with respect to upper frame member 14 around pivot lines 20 and 26 (forward pivoting crosstube 20 and pivoting tubes 26) until the folded state shown in FIG. 16b is reached. The movement of rear links 18 with respect to upper frame 14 causes spring links 19 to be pushed backwardly with respect to upper frame member 14, rotating trailing links 23 around pivot points 27, as discussed earlier. This movement swings rear wheels 188 forward to the position under upper frame member 14 shown in FIG. 2.

Minicar 10 could also be provided with headlights 272 for driving during nighttime or inclement weather.

Minicar 10 can be developed into a more sophisticated vehicle by adding more controls, such as ignition switch 266, light switch 268, and starter button 270. Such are well known in the art and thus not illustrated in detail. Other controls could be added as desired.

Once given the above disclosure, many other features, modifications and improvements will become apparent to one skilled in the art. For example, it is possible to use means other than a gasoline engine. Such other features, modifications, and improvements are, therefore, considered to be a part of this invention, the scope of which is to be determined by the following claims:

I claim:

1. A foldable vehicle having a motor, a seat, a pair of spaced front wheels and a pair of spaced rear wheels, said foldable vehicle comprising:
    a first and a second frame, said front wheels being attached to said first frame and said rear wheels being attached to said second frame,
    said motor and said seat being supported by said second frame,
    said first frame being designed and arranged to support the feet of a person sitting in said seat, and,
    articulated linkage connecting said first and second frames and being capable of rotating said first and second frames with respect to each other between operating and folded positions while maintaining said first and second frames in substantially the same horizontal angular relationship with each other,
    wherein said foldable vehicle is designed and arranged to be folded and unfolded by applying a horizontal force on one of said frames in the opposite direction as a horizontal force being applied on the other of said frames.

2. A foldable vehicle according to claim 1 wherein said first frame is located substantially in front of said second frame when the vehicle is in the operating position and wherein said frames are maintained in a substantially parallel position when folded and unfolded by said articulated linkage system.

3. A foldable vehicle according to claim 2 further comprising a floorboard, said floorboard being supported by said first frame.

4. A foldable vehicle according to claim 3 wherein said articulated linkage includes a pair of front links which are rotatably connected to and extend between the front portions of said frames and a pair of rear links which are rotatably connected to and extend between the rear portions of said frames.

5. A foldable vehicle according to claim 4 wherein the front and rear links are attached to said frames such that an approximate parallelogram is formed by connecting all the attachment points of a complementary said front and said rear link to said frames.

6. A foldable vehicle according to claim 5 wherein said front links are in the shape of a dog leg.

7. A foldable vehicle according to claim 6 further comprising a locking means for preventing said vehicle from folding up or unfolding,
    said locking means including a sleeve member and a retention strut, said sleeve member being located on said strut,
    said retention strut being rotatably attached to one of said frames or one of said links,
    said sleeve member being located on another of said links,
    whereby when said sleeve member is tightened, said sleeve member locks said linkage and said frames in a fixed position.

8. A foldable vehicle according to claim 7 wherein said retention strut is attached to the second frame and said sleeve is located on one of said rear links.

9. A foldable vehicle according to claim 8 wherein said retention strut is attached to said second frame by the same member which attaches said front link to said second frame.

10. A foldable vehicle according to claim 1 further comprising, a second linkage system,
    said second linkage system extending between and being connected to said articulated linkage system, said second frame, and said rear wheels,
    whereby when said frames are rotated between said folded and said operating positions, said second linkage system rotates said rear wheels around said second frame between folded and operating positions.

11. A foldable vehicle according to claim 10 further comprising a substantially flat bulkhead which is attached to said first frame in a vertical position.

12. A foldable vehicle according to claim 11 further comprising a foldable enclosure which is designed and arranged to be folded up on top of said seat when said vehicle is in the folded position.

13. A foldable vehicle comprising:
    a first and a second frame,
    an articulated linkage system extending between and connecting said first and second frames, said articulated linkage system capable of rotating said first and second frames with respect to each other between a folded and an operating position, and a first and a second wheel,
    said first wheel being attached to said first frame,
    said second wheel being attached to a second linkage system which is also attached to said articulated linkage system and said second frame,
    whereby when said first and second frames are rotated between said folded and said operating positions, said second linkage system rotates said rear wheel around said second frame between folded and operating positions.

14. A foldable vehicle according to claim 13 wherein said articulated linkage system includes rear links and wherein said second linkage system is connected to said rear links.

15. A foldable vehicle according to claim 14 wherein said second linkage system is designed and arranged such that connection of the second linkage system to the rear wheel is located behind the connection of the second linkage system to the second frame when the second linkage system and rear wheel are in the operating position and wherein the connection of said second linkage system to said wheel is located in front of the connection of said second linkage system to the second frame when the second linkage system and the rear wheel are in the folded position.

16. A foldable vehicle according to claim 15 wherein said second linkage system includes spring links and trailing links, said spring links being connected at one end to said rear links and on the other end to said trailing links, said trailing links being pivotally connected to said second frame and having the rear wheels attached thereto.

* * * * *